US008499663B2

(12) United States Patent
Johnson et al.

(10) Patent No.: US 8,499,663 B2
(45) Date of Patent: Aug. 6, 2013

(54) BRAKE PEDAL STOP

(75) Inventors: Duane R. Johnson, Wellington, OH (US); Jeffrey J. Krause, Wellington, OH (US); Mark H. Sciulli, Lorain, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 683 days.

(21) Appl. No.: 12/710,083

(22) Filed: Feb. 22, 2010

(65) Prior Publication Data

US 2011/0203405 A1 Aug. 25, 2011

(51) Int. Cl.
*B60T 7/04* (2006.01)
*G05G 1/46* (2008.04)

(52) U.S. Cl.
USPC .............................................. 74/512; 74/526

(58) Field of Classification Search
USPC ............... 74/512, 513, 526, 560; 188/106 R, 188/106 F; 180/6.24; 192/99 S
See application file for complete search history.

(56) References Cited

U.S. PATENT DOCUMENTS 1,519,744 A * 12/1924 Thomas ....................... 192/99 S
1,553,647 A * 9/1925 Thomas .......................... 74/512
1,669,325 A * 5/1928 Buckley ........................ 188/291
1,788,861 A 1/1931 Crawford
2,021,858 A 11/1935 Jarvis
2,977,817 A 4/1961 Panasewicz
3,112,820 A * 12/1963 Falk ............................ 192/99 S
3,273,418 A 9/1966 Ellis
3,394,614 A * 7/1968 Zeidler .......................... 74/522
4,086,824 A * 5/1978 Johnson .......................... 74/481
4,270,646 A * 6/1981 Norcross .................. 192/70.252
4,541,300 A 9/1985 Kwiatkowski et al.
4,860,668 A 8/1989 Baudenbacher
5,054,333 A 10/1991 Scott et al.
6,408,711 B1 6/2002 Mizuma et al.
6,418,812 B2 7/2002 Mizuma et al.
6,629,586 B2 * 10/2003 Smyly et al. .............. 188/106 R
6,655,489 B2 12/2003 Kawai et al.
7,428,856 B2 9/2008 Podkopayev

OTHER PUBLICATIONS

Bendix Installation Instructions Sheet, Hydro-Max Booster Kit Piece No. 5008684, S-1307, Mar. 2001.
Service Manual Section, Steering Column Assembly, Tilt/Telescoping, Model: Prostar, S05018, International Truck and Engine Corporation, Jan. 31, 2007.

* cited by examiner

*Primary Examiner* — Thomas Diaz
(74) *Attorney, Agent, or Firm* — Calfee, Halter & Griswold LLP

(57) ABSTRACT

A braking assembly includes a depressible brake pedal. The brake pedal remains in a neutral position when not depressed. A link arm is mechanically linked with the brake pedal. The link arm moves as a function of a position of the brake pedal. A bell crank is mechanically linked with the link arm. The bell crank moves as a function of a position of the link arm. A stop member moves with the bell crank. The stop member abuts against the link arm to prevent the brake pedal from over-travelling beyond a predetermined distance past the neutral position after the depressed brake pedal is released.

18 Claims, 4 Drawing Sheets

BRAKE PEDAL STOP

BACKGROUND

The present invention relates to vehicle braking systems. It finds particular application in conjunction with service braking systems and will be described with particular reference thereto. It will be appreciated, however, that the invention is also amenable to other applications.

Heavy vehicles typically include hydraulic or air braking systems. During a service brake application, a suspended brake pedal is depressed in a forward direction from an initial position by an operator's foot. Upon release, a return spring may cause the brake pedal to over-travel rearward and momentarily "snap back" too far rear of the initial (neutral) position (before returning to rest at the initial position). Other conditions that may cause the brake pedal to over-travel are when the pedal is grabbed by an operator while getting into or cleaning the vehicle, when the operator's foot slips off the pedal or when the pedal gets hooked onto an operator's shoe. While the pedal is rearward of the initial position, a linkage malfunction may occur. For example, a brake (push) rod may become disengaged from an associated reaction pin of the master cylinder. If such a disengagement occurs, the pedal rod may drop below the reaction pin and result in loss of braking ability.

A loss of braking ability may also occur if a roller is used to apply force to the brake valve. In "slip foot" testing, if the brake pedal is allowed to "snap back" unrestricted past the initial position, a brake control arm (e.g., plunger) may fall out of a plunger guide of a brake component, thereby resulting in a loss of braking ability.

The issue of disengagement has become more complex with the introduction of adjustable brake pedals.

The present invention provides a new and improved apparatus and method.

SUMMARY

In one aspect of the present invention, it is contemplated that a braking assembly includes a depressible brake pedal. The brake pedal remains in a neutral position when not depressed. A link arm is mechanically linked with the brake pedal. The link arm moves as a function of a position of the brake pedal. A bell crank is mechanically linked with the link arm. The bell crank moves as a function of a position of the link arm. A stop member moves with the bell crank. The stop member abuts against the link arm to prevent the brake pedal from over-travelling beyond a predetermined distance past the neutral position after the depressed brake pedal is released.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
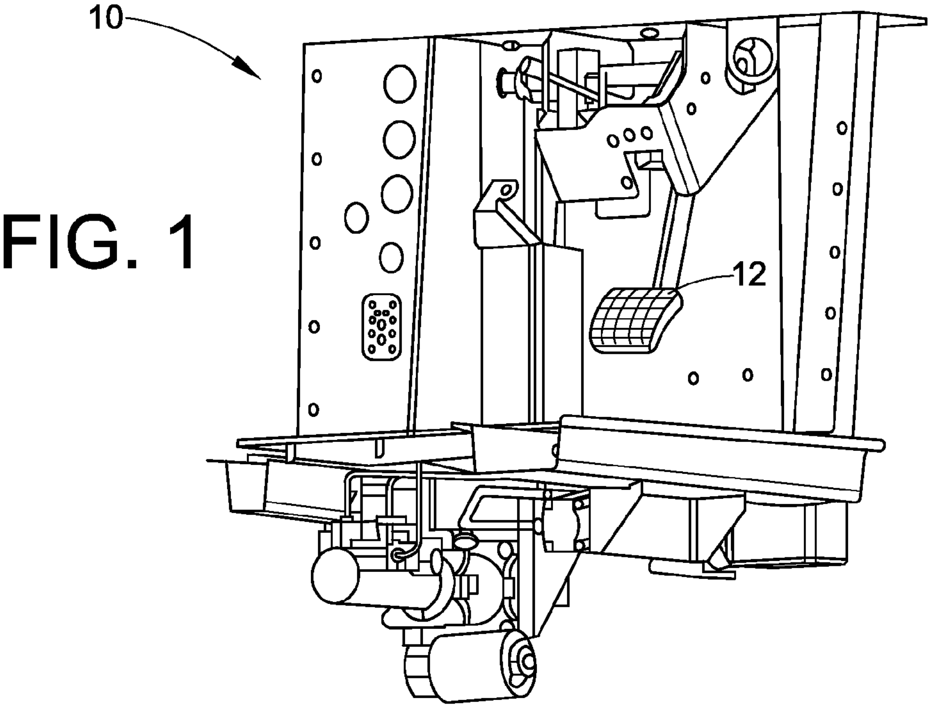
FIG. 1 illustrates a front perspective view of a partial braking assembly in accordance with one embodiment of an apparatus illustrating principles of the present invention.
Figure 2:
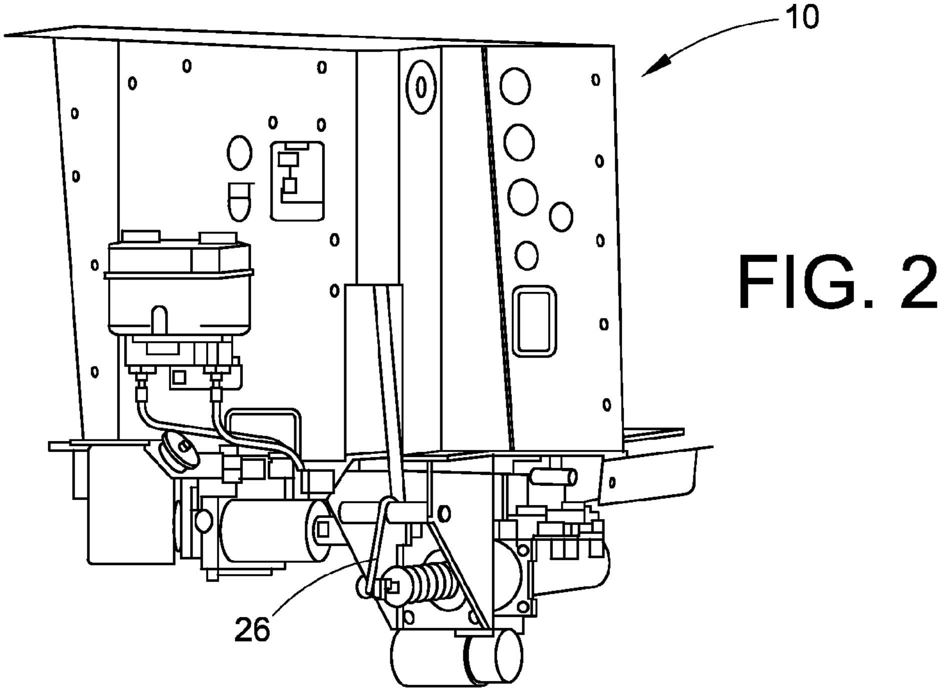
FIG. 2 illustrates a rear perspective view of the partial braking assembly illustrated in FIG. 1.

With reference to FIGS. 1 and 2, a front perspective view and a rear perspective view, respectively, of a partial braking assembly 10 are illustrated in accordance with one embodiment of the present invention.

Figure 3:
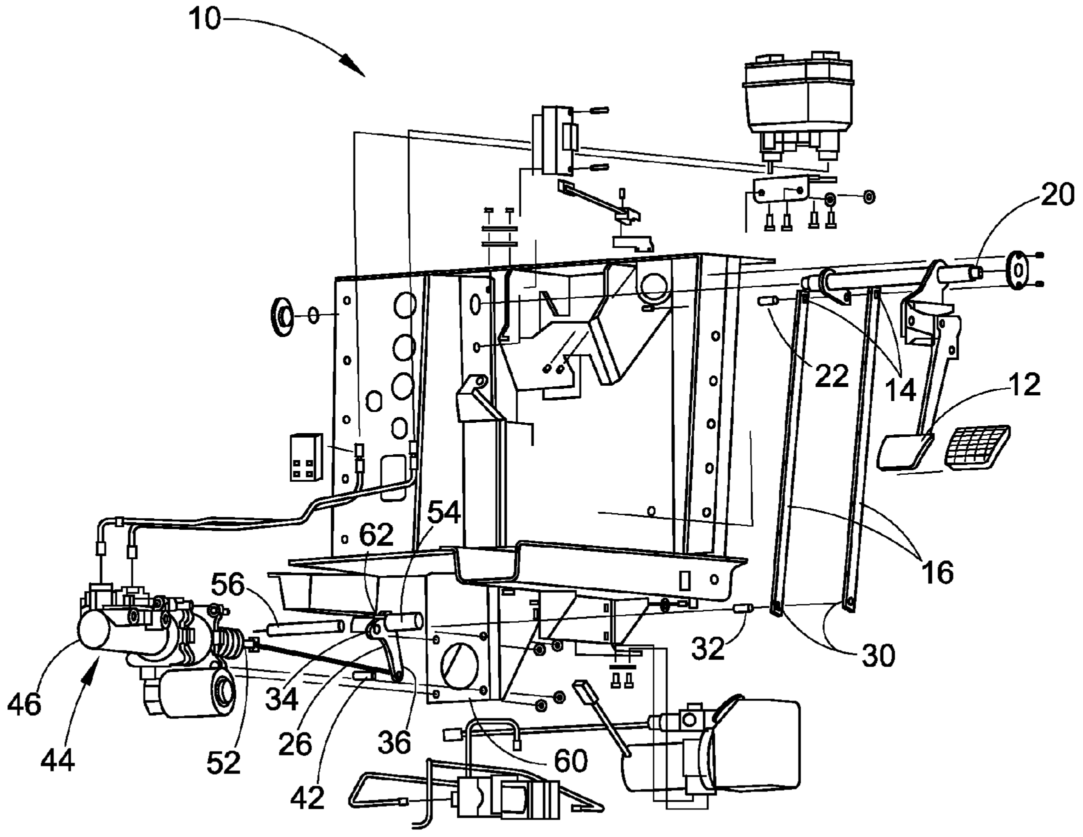
FIG. 3 illustrates an exploded front view of the partial braking assembly illustrated in FIG. 1.

With reference to FIG. 3, an exploded front view of the partial braking assembly 10 is illustrated.

The partial braking assembly 10 includes a brake pedal 12 mechanically linked proximate to a first end 14 of a pair 16 of link arms via a brake pedal rod 20 and mechanical connectors. In one embodiment, the brake pedal 12 is adjustable to accommodate drivers of different heights. A bell crank 26 is mechanically linked proximate a second end 30 of the link arms 16 via, for example, connections 22, 32 (e.g., a pin).

The illustrated bell crank 26 is substantially L-shaped and includes first and second arms 34, 36, respectively. The first arm 34 of the bell crank 26 is mechanically linked with the link arms 16 via the pin 22. The second arm 36 of the bell crank 26 is mechanically linked proximate a first end of a brake component rod 52 via, for example, a connection 42 (e.g., a pin). The brake component rod 52 is mechanically linked to a brake component 44. The brake component 44 controls flow of a fluid (e.g., a hydraulic fluid) in a master cylinder 46. The brake component 44 controls the flow of the fluid in the master cylinder 46 as a function of a position of the brake component rod 52.

The bell crank 26 also includes a pivot connector 54 pivotally connected, via a pivot shaft 56, to a housing 60 secured with a dash of a vehicle. The first arm 34 of the bell crank 26 is between i) the mechanical link between the link arm 16 and the bell crank 26 and ii) the pivotal connection of the bell crank 26 with the housing 60. A stop member 62 is positioned along the first arm 34 of the bell crank 26 (across from the linkage connection between the bell crank 26 and the brake component rod 52). The stop member 62 is discussed in more detail below.

As discussed above, the brake pedal 12, the brake pedal rod 20, the link arms 16, the bell crank 26, the brake component rod 52, and the brake component 44 are mechanically linked. When the brake pedal 12 is not depressed, the brake pedal 12, along with the brake pedal rod 20, the link arms 16, the bell crank 26, the brake component rod 52, and the internal components of the brake component 44, are assumed to be in their respective neutral (released) positions. When the brake pedal 12 is depressed, the respective mechanical linkages cause the brake pedal rod 20, the link arms 16, the bell crank 26, the brake component rod 52, and the internal components of the brake component 44 to move as a function of a position of the brake pedal 12. More specifically, the brake pedal rod 20 moves as a function of a position of the brake pedal 12; the link arms 16 move as a function of a position of the brake pedal rod 20 (and a position of the brake pedal 12); the bell crank 26 moves as a function of a position of the link arms 16 (and respective positions of the brake pedal rod 20 and the brake pedal 12); and the brake component rod 52 moves as a function of a position of the bell crank 26 (and respective positions of the link arms 16, the brake pedal rod 20, and the brake pedal 12).

The stop member 62 moves with the bell crank 26. In one embodiment, the stop member 62 is integral with the bell crank 26. For example, it is contemplated that the stop member 62 is press-fit into the bell crank 26 (the first arm 34 of the bell crank 26). However, other techniques of integrating the stop member 62 with the bell crank 26 are also contemplated (e.g., welding the stop member 62 to the bell crank 26).

Figure 4:
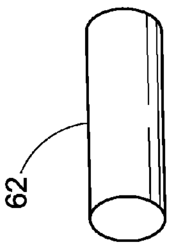
FIG. 4 illustrates an isometric view of a stop member in accordance with one embodiment of an apparatus illustrating principles of the present invention.

In the embodiment illustrated in FIG. 4, the stop member 62 is substantially cylindrically shaped. It is contemplated that the stop member 62 is about 0.825"±0.015" long with a diameter of about 0.250"±0.005".

Figure 5:
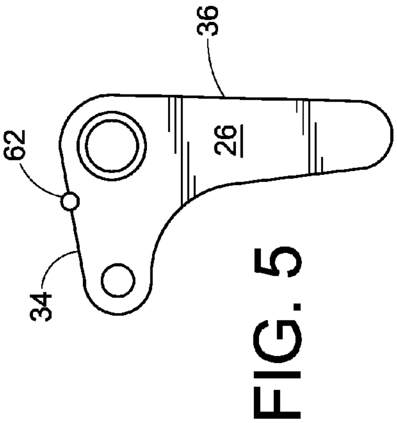
FIG. 5 illustrates a schematic representation of a bell crank in accordance with one embodiment of an apparatus illustrating principles of the present invention.

With reference to FIG. 5, it is contemplated that the stop member 62 protrudes beyond a perimeter edge of the first arm 34 of the bell crank 26—in other words, the stop member 62 creates a "bump" along the perimeter edge of the first arm 34 of the bell crank 26. For example, as illustrated, a first portion (e.g., about one-half) of the stop member 62 is embedded in the bell crank 26, while the remaining portion of the stop member 62 protrudes above the perimeter edge of the first arm 34 of the bell crank 26.

Figure 6:
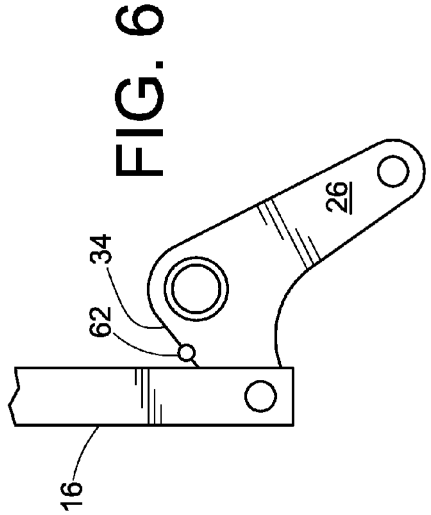
FIG. 6 illustrates a representation of relative positions of the link arms and the bell crank in accordance with one embodiment of the present invention while the brake pedal is in the neutral (released) position.

FIG. 6 illustrates a position of the link arms 16 relative to a position of the bell crank 26 (e.g., the first arm 34 of the bell crank 26) when the brake pedal 12 (see FIGS. 1 and 3) is in the neutral (released) position. In the illustrated embodiment, when the brake pedal 12 (see FIGS. 1 and 3) is in the neutral (released) position, the stop member 62 does not engage the link arms 16.

Figure 7:
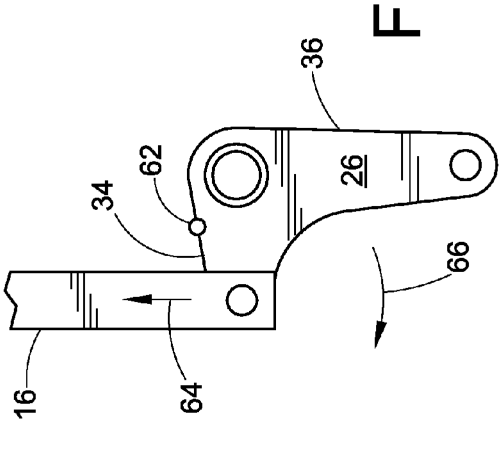
FIG. 7 illustrates a representation of relative positions of the link arms and the bell crank in accordance with one embodiment of the present invention while the brake pedal is depressed (applied)

FIG. 7 illustrates a position of the link arms 16 relative to a position of the bell crank 26 (e.g., the first arm 34 of the bell crank 26) while the brake pedal 12 is depressed. As the brake pedal 12 is depressed, the link arms 16 move upward relative to when the brake pedal 12 is in the neutral (released) position. As the link arms 16 move upward, the first arm 34 of the bell crank 26 moves upward (as illustrated by the arrow 64), and the second arm 36 of the bell crank 26 moves leftward (as illustrated by the arrow 66). As the second arm 36 of the bell crank 26 moves leftward, the brake component rod 52 (see FIG. 3) also move leftward to apply the vehicle brakes. As in FIG. 6, the stop member 62 does not engage the link arms 16. In fact, as the link arms 16 move upward, the stop member 62 actually moves away from, and does not interfere with, the link arms 16.

Figure 8:
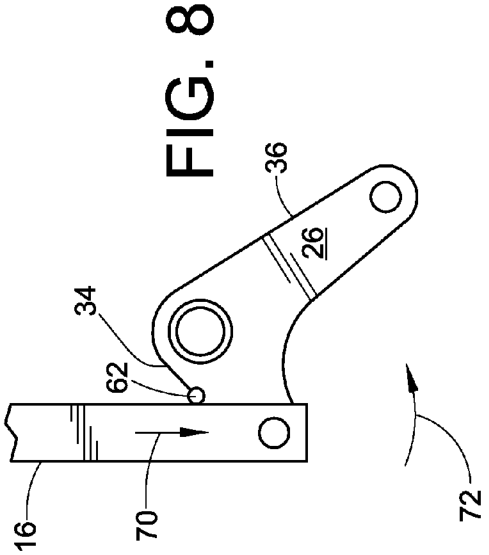
FIG. 8 illustrates a representation of relative positions of the link arms and the bell crank in accordance with one embodiment of the present invention shortly after the brake pedal is released, and during a release period before the brake pedal returns to the neutral position.

FIG. 8 illustrates a position of the link arms 16 relative to a position of the bell crank 26 (e.g., the first arm 34 of the bell crank 26) shortly after the brake pedal 12 (see FIG. 3) is released (e.g., during a release period while the brake pedal 12 (see FIG. 3) has over-traveled within a predetermined distance past the neutral position, and before the brake pedal 12 (see FIG. 3) returns to the neutral position). As illustrated in FIG. 8, the link arms 16 move downward (as illustrated by the arrow 70) when the brake pedal 12 is released. When the brake pedal 12 is initially released (i.e., during the release period), the second arm 36 of the bell crank 26 may travel too far (over-travel) to the right (as illustrated by the arrow 72) in certain situations (e.g., the operator's foot slips). As discussed above, it is desirable to prevent the second arm 36 of the bell crank 26 from over-traveling in the direction of the right arrow 72 (to prevent, for example, the brake component rod 52 becoming disengaged from the brake component 44). In the illustrated embodiment, the stop member 62 abuts the link arms 16 shortly after the brake pedal 12 (see FIG. 3) is released (e.g., during the release period while the brake pedal 12 (see FIG. 3) has over-traveled within the predetermined distance past the neutral position, and before the brake pedal 12 (see FIG. 3) returns to the neutral position) to prevent the second arm 36 of the bell crank 26 from over-traveling in the direction of the right arrow 72. After the stop member 62 abuts the link arms 16 (and after the release period), the link arms 16 and the bell crank 26 return to the neutral positions (e.g., the positions illustrated in FIG. 6). It is to be understood that although the stop member 62 may prevent the second arm 36 of the bell crank 26 from over-traveling in the direction of the right arrow 72, the brake pedal 12 (see FIG. 3) may travel a short predetermined distance past the neutral position (during the release period) before returning to the neutral position.

As discussed above, the bell crank 26 illustrated in FIGS. 2, 3, and 5-8 is suitable for use in a hydraulic brake system.

Figure 9:
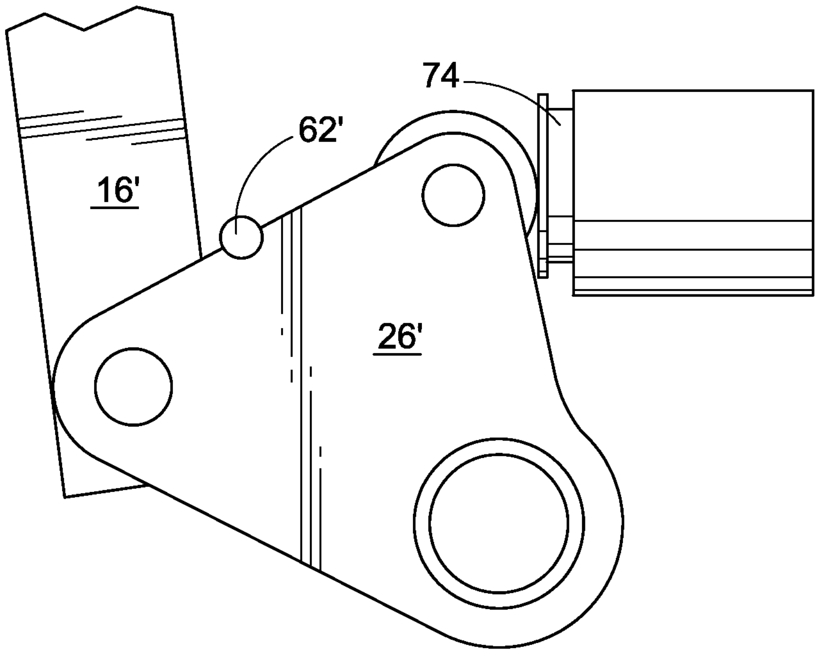
FIG. 9 illustrates a schematic representation of a bell crank in accordance with another embodiment of an apparatus illustrating principles of the present invention.

FIG. 9 illustrates a bell crank 26' in a second embodiment of the present invention. The bell crank 26' is suitable for use in an air brake system. In this embodiment, as the link arms 16' (only one of which is illustrated) move upward (when the pedal is depressed), the bell crank 26' rotates to depress a plunger for an air brake device 74. As the link arms 16' move downward (when the pedal is released), the stop member 62' abuts the link arms 16' in a similar manner as discussed above to prevent over-traveling of the bell crank 26' beyond the neutral position.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A braking assembly, comprising:

a depressible brake pedal, the brake pedal remaining in a neutral position when not depressed;

a link arm mechanically linked with the brake pedal, the link arm moving as a function of a position of the brake pedal;

a bell crank mechanically linked with the link arm, the bell crank moving as a function of a position of the link arm; and a stop member moving with the bell crank and abutting against the link arm when the brake pedal over-travels a predetermined distance past the neutral position after the brake pedal is released, the stop member preventing the bell crank from over-travelling beyond the predetermined distance.

2. The braking assembly as set forth in claim 1, wherein: the stop member is integral with the bell crank.

3. The braking assembly as set forth in claim 1, wherein: the stop member is substantially cylindrically shaped.

4. The braking assembly as set forth in claim 1, wherein: the stop member protrudes beyond a perimeter edge of the bell crank.

5. The braking assembly as set forth in claim 1, wherein: the mechanical link between the brake pedal and the link arm and the mechanical link between the link arm and the bell crank cause the stop member to move away from the link arm when the brake pedal is depressed.

6. The braking assembly as set forth in claim 5, wherein: the mechanical link between the brake pedal and the link arm and the mechanical link between the link arm and the bell crank cause the stop member to move toward the link arm when the brake pedal is released from a depressed position.

7. The braking assembly as set forth in claim 1, wherein: after the brake pedal is released and over-travels the predetermined distance past the neutral position, the brake pedal returns to the neutral position.

8. The braking assembly as set forth in claim 1, wherein:
the mechanical link between the brake pedal and the link arm causes the link arm to move relative to the brake pedal as the brake pedal moves; and
the mechanical link between the link arm and the bell crank causes bell crank to move relative to the link arm as the brake pedal moves.

9. The braking assembly as set forth in claim 8, wherein: the stop member does not interfere with the movement of the bell crank relative to the link arm as the brake pedal is depressed.

10. The braking assembly as set forth in claim 8, wherein:
the bell crank is also mechanically linked with at least one of a rod and a plunger of an associated brake component, the at least one of the rod and the plunger of the brake component moving as a function of a position of the bell crank;
the bell crank is also pivotally connected with a housing secured to a dash of an associated vehicle, and
the stop member is positioned on a perimeter edge of the bell crank between i) the mechanical link between the link arm and the bell crank and ii) the pivotal connection of the bell crank with the housing.

11. A braking assembly, comprising:
a depressible brake pedal, the brake pedal remaining in a neutral position when not depressed;
a link arm;
a first linkage connection between the brake pedal and the link arm causing the link arm to move as a function of a position of the brake pedal; and
a bell crank, including:
a second linkage connection between the link arm and the bell crank causing the bell crank to move as a function of a position of the brake pedal;
a pivotal connection to a housing on a dash of an associated vehicle;
a third linkage connection between the bell crank and at least one of a rod and a plunger of a brake component, the at least one of the rod and the plunger of the brake component moving to apply the vehicle brakes as a function of a position of the brake pedal; and
a stop member abutting the link arm when the brake pedal travels a predetermined distance past the neutral position after the brake pedal is released, to limit the bell crank over-travel to the predetermined distance for preventing the at least one of the rod and the plunger of the brake component becoming disengaged from the brake component after the depressed brake pedal is released.

12. The braking assembly as set forth in claim 11, wherein the brake pedal from may over-travel past the predetermined distance beyond the neutral position after the depressed brake pedal is released.

13. The braking assembly as set forth in claim 11, wherein: the stop member is positioned on a perimeter edge of the bell crank across from the third linkage connection.

14. The braking assembly as set forth in claim 13, wherein the stop member protrudes above the perimeter edge of the bell crank.

15. A method for preventing a vehicle brake pedal from over-travelling past a neutral position after the depressed brake pedal is released, the method comprising:
mechanically linking a link arm with the brake pedal, the link arm moving as a function of a position of the brake pedal;
mechanically linking a bell crank with the link arm, the bell crank moving as a function of a position of the link arm;
positioning a stop member on the bell crank; and
ensuring the stop member abuts the link arm when the brake pedal over-travels a predetermined distance past the neutral position after the brake pedal is released to limit the bell crank from over-travelling beyond the predetermined distance.

16. The method for preventing a vehicle brake pedal from over-travelling past a neutral position after the depressed brake pedal is released as set forth in claim 15, further including:
pivotally attaching the bell crank to a housing secured to a dash of an associated vehicle.

17. The method for preventing a vehicle brake pedal from over-travelling past a neutral position after the depressed brake pedal is released as set forth in claim 16, further including:
positioning the stop member on a perimeter edge of the bell crank between i) the mechanical link between the link arm and the bell crank and ii) the pivotal connection of the bell crank with the housing.

18. The method for preventing a vehicle brake pedal from over-travelling past a neutral position after the depressed brake pedal is released as set forth in claim 15, further including:
mechanically linking the bell crank and at least one of a rod and a plunger of a brake component, the at least one of the rod and the brake plunger of the brake component moving to apply the vehicle brakes as a function of a position of the brake pedal; and
positioning the stop member to abut with the link arm to prevent the at least one of the rod and the brake plunger of the brake component from becoming disengaged after the depressed brake pedal is released.

* * * * *